(12) United States Patent
Hayakawa et al.

(10) Patent No.: US 11,300,780 B2
(45) Date of Patent: Apr. 12, 2022

(54) SCANNING OPTICAL DEVICE WITH SCANNING LENS SUPPORTING STRUCTURE

(71) Applicant: Brother Kogyo Kabushiki Kaisha, Nagoya (JP)

(72) Inventors: Kazuhiro Hayakawa, Nagoya (JP); Hitoshi Fujino, Tajimi (JP); Yoshifumi Nakamura, Suzuka (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/934,453

(22) Filed: Jul. 21, 2020

(65) Prior Publication Data

US 2021/0041688 A1 Feb. 11, 2021

(30) Foreign Application Priority Data

Aug. 6, 2019 (JP) .............................. JP2019-144216

(51) Int. Cl.
*G02B 26/12* (2006.01)
(52) U.S. Cl.
CPC ......... *G02B 26/121* (2013.01); *G02B 26/125* (2013.01)

(58) Field of Classification Search
None
See application file for complete search history.

(56) References Cited

U.S. PATENT DOCUMENTS

| | | | |
|---|---|---|---|
| 5,111,340 A | 5/1992 | Kashima | |
| 2012/0307329 A1* | 12/2012 | Sugiyama | ............ G02B 26/123 359/204.1 |

FOREIGN PATENT DOCUMENTS

| | | |
|---|---|---|
| JP | H03-208008 A | 9/1991 |
| JP | 2004-287271 A | 10/2004 |
| JP | 2013-164483 A | 8/2013 |

* cited by examiner

*Primary Examiner* — Jennifer D. Carruth
(74) *Attorney, Agent, or Firm* — Burr & Brown, PLLC

(57) ABSTRACT

A scanning optical device includes a scanning lens, a deflector, and a frame configured to support the scanning lens and the deflector. The deflector includes a substrate, a motor fixed to the substrate, and a polygonal mirror rotary driven by the motor. The scanning lens is arranged such that a longitudinal direction thereof is oriented in a main scanning direction of the deflector. The frame includes a supporting part configured to support the scanning lens. The supporting part is located such that the substrate and at least a portion of the supporting part overlap when viewed in a rotation axis direction of the motor.

18 Claims, 7 Drawing Sheets

SCANNING OPTICAL DEVICE WITH SCANNING LENS SUPPORTING STRUCTURE

CROSS-REFERENCE TO RELATED APPLICATION

This application claims priority under 35 U.S.C. § 119 from Japanese Patent Application No. 2019-144216 filed on Aug. 6, 2019. The entire subject matter of the application is incorporated herein by reference.

BACKGROUND

Technical Field

Aspects of the present disclosure relate to a scanning optical device including a polygonal mirror and a scanning lens.

Related Art

A scanning optical device has been known in which a scanning lens is arranged adjacent to a polygonal mirror. In the conventional scanning optical device, a lens holder for the scanning lens is provided separately from a frame that supports a motor configured to drive the polygonal mirror to rotate in order to arrange the scanning lens closer to the polygonal mirror, and the lens holder is fixed to the frame.

SUMMARY

However, in the case where the lens holder is made of a member that is separate from the frame, an assembling error may occur to a position of the lens holder with respect to a position of the motor when assembling the lens holder to the frame. Therefore, there is a problem that an accuracy of a position of the scanning lens with respect to the polygonal mirror lowers.

Aspects of the present disclosure are advantageous to provide a scanning optical device that makes it possible to arrange the scanning lens adjacent to the polygonal mirror without lowering the accuracy of the position of the scanning lens with respect to the polygonal mirror.

According to aspects of the present disclosure, there is provided a scanning optical device including a scanning lens, a deflector, and a frame configured to support the scanning lens and the deflector. The deflector includes a substrate, a motor fixed to the substrate, and a polygonal mirror rotary driven by the motor. The scanning lens is arranged such that a longitudinal direction thereof is oriented in a main scanning direction of the deflector. The frame includes a supporting part configured to support the scanning lens. The supporting part is located such that the substrate and at least a portion of the supporting part overlap when viewed in a rotation axis direction of the motor.

BRIEF DESCRIPTION OF THE ACCOMPANYING DRAWINGS

Figure 1:
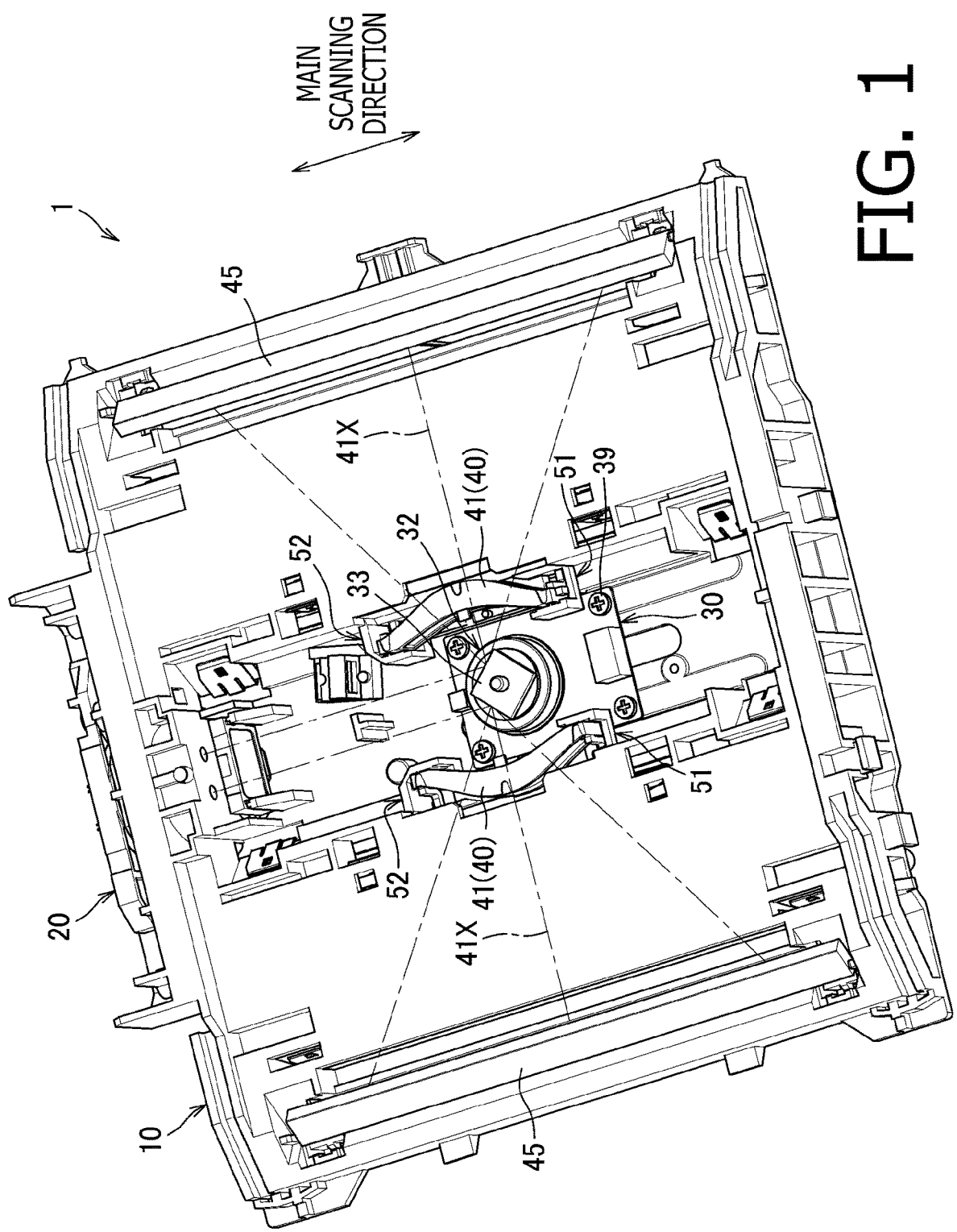
Figure 2A:
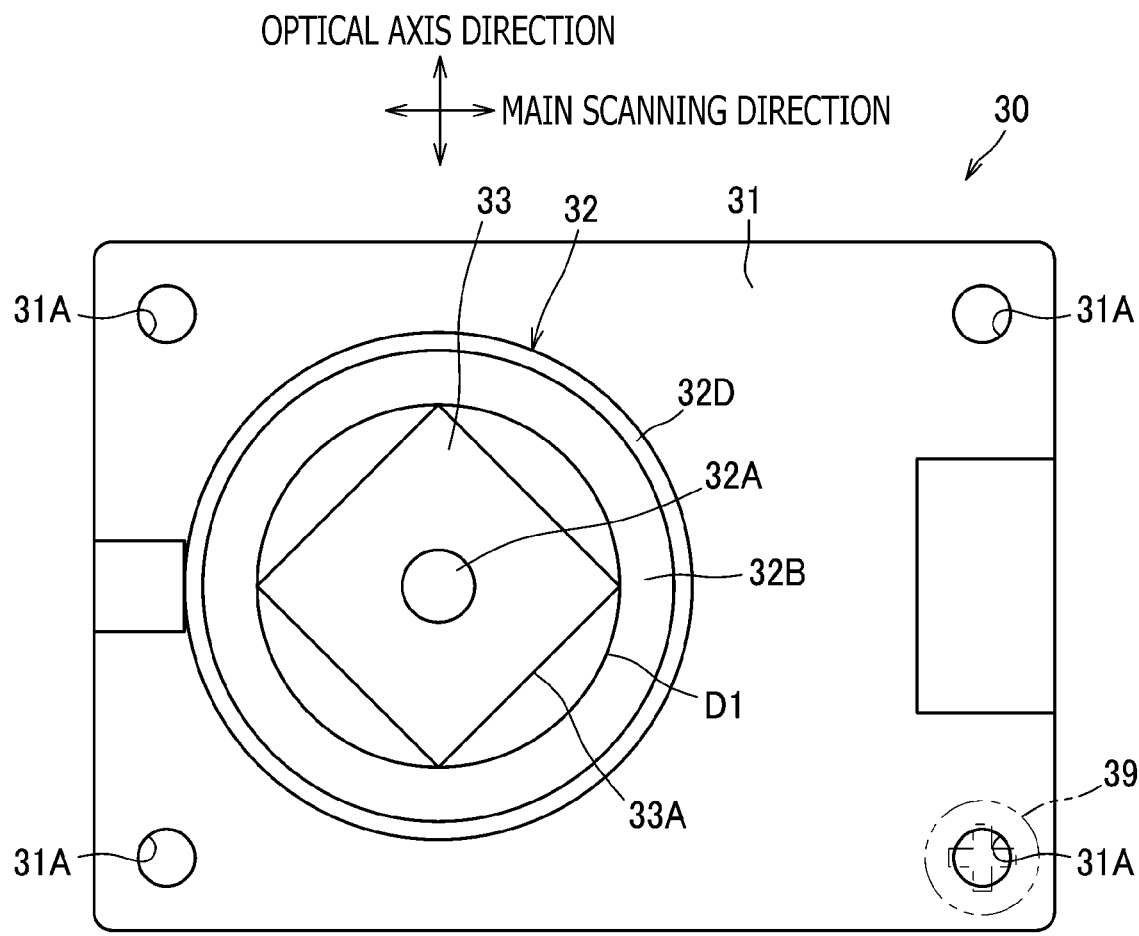
Figure 2B:
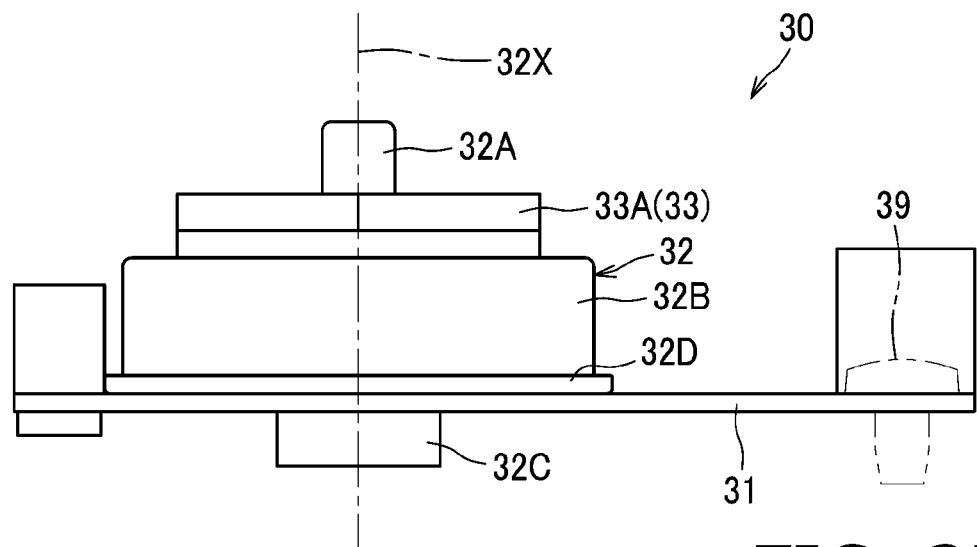
Figure 3:
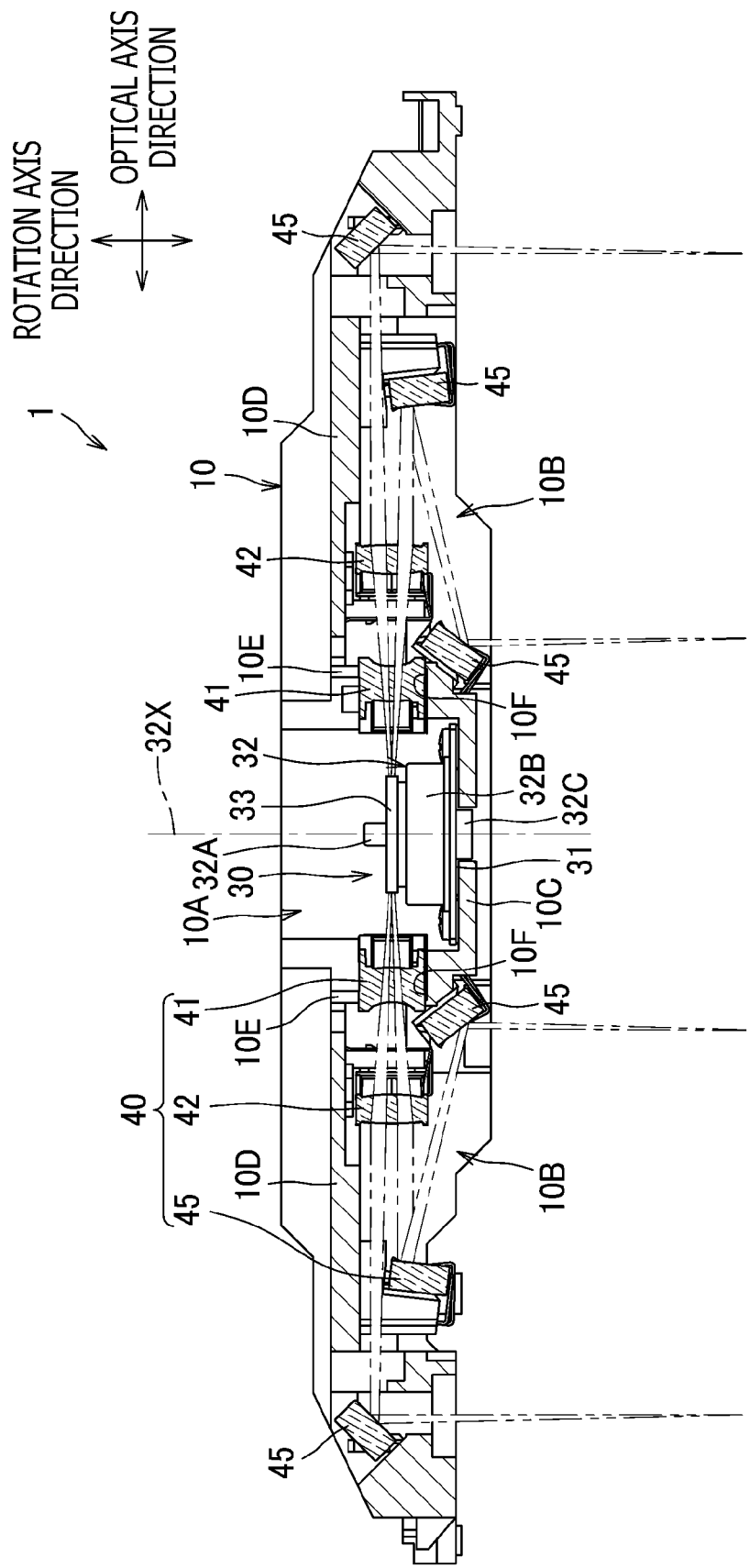
Figure 4:
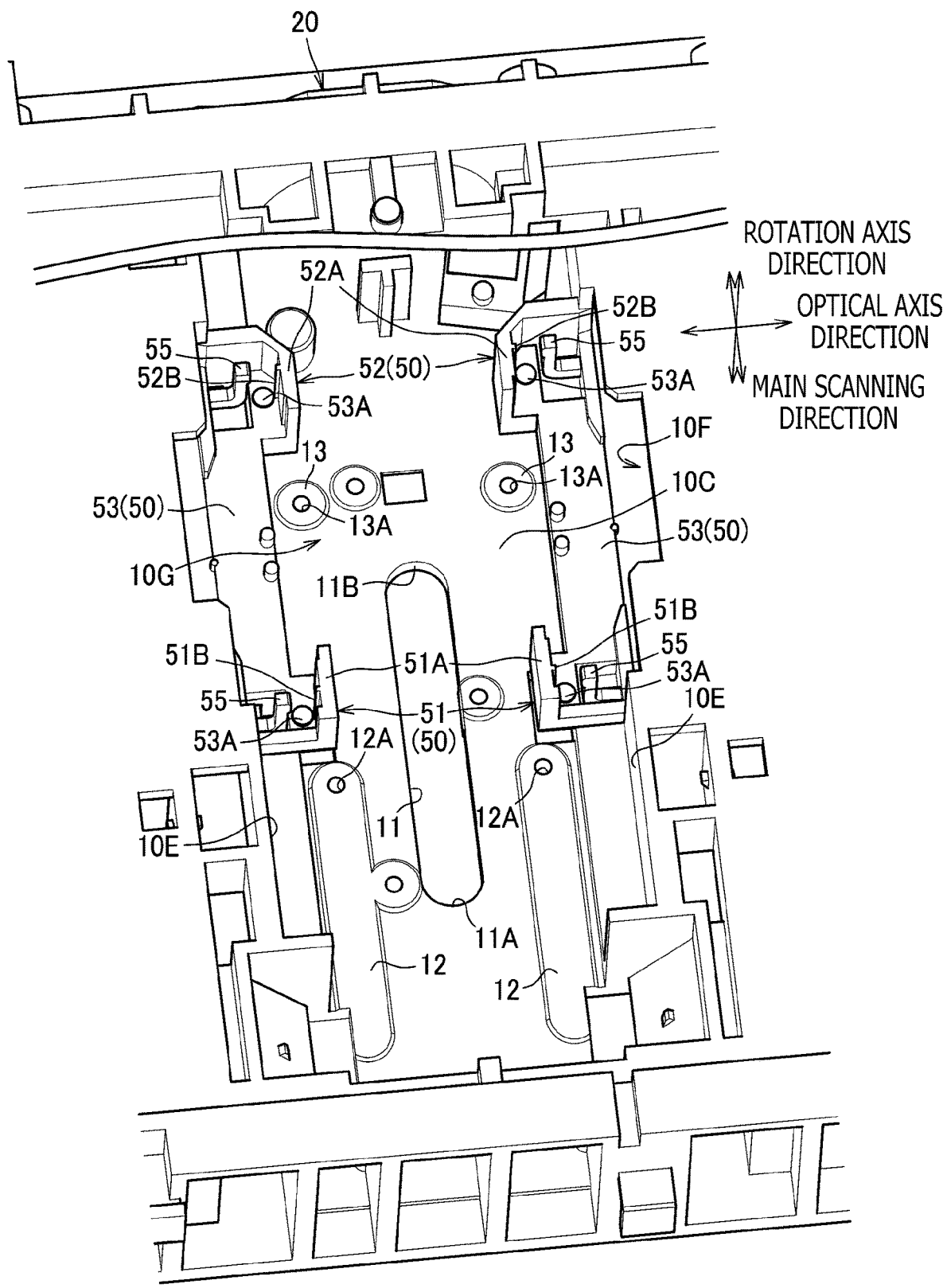
Figure 5:
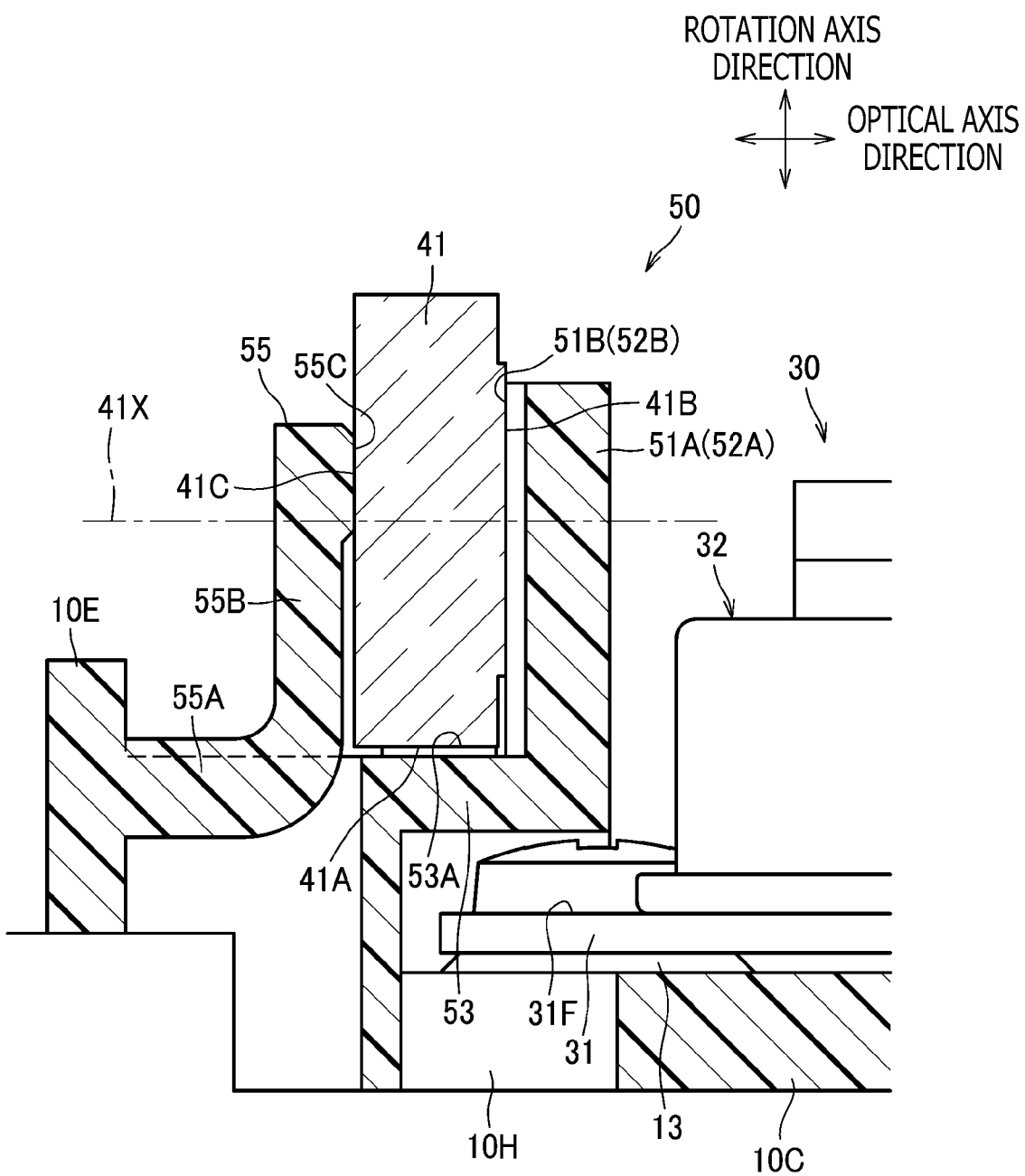
Figure 6A:
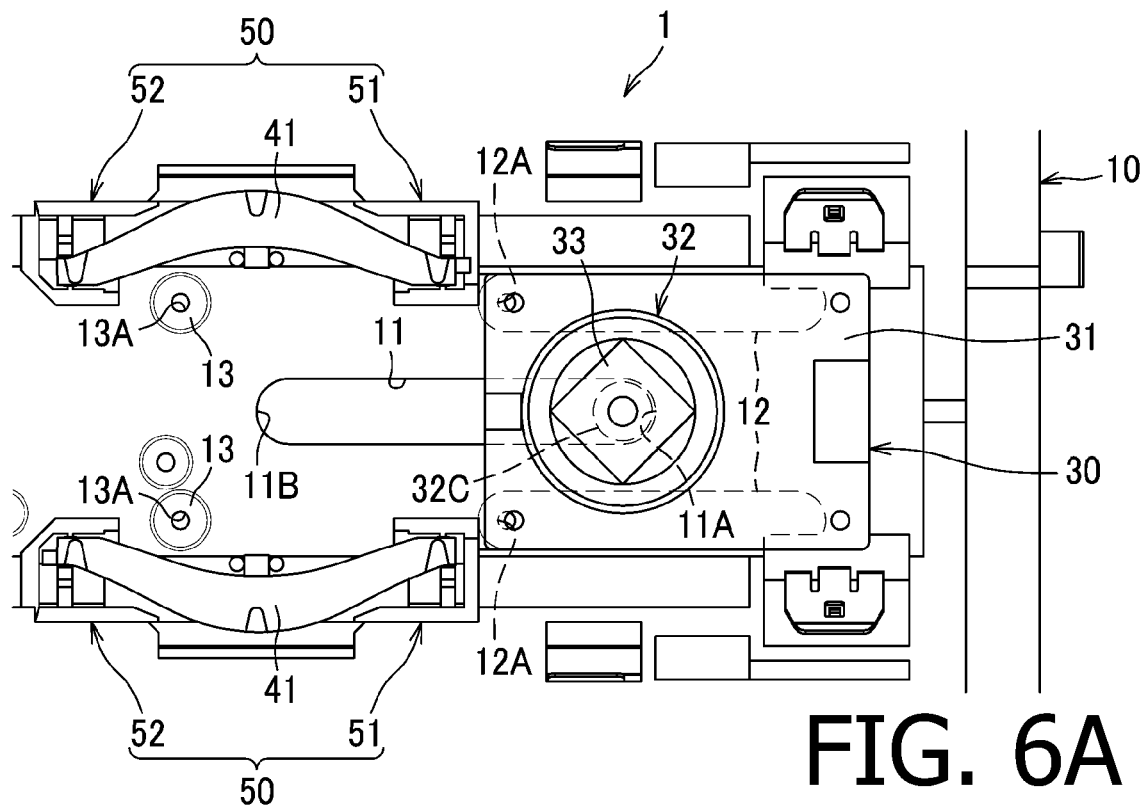
Figure 6B:
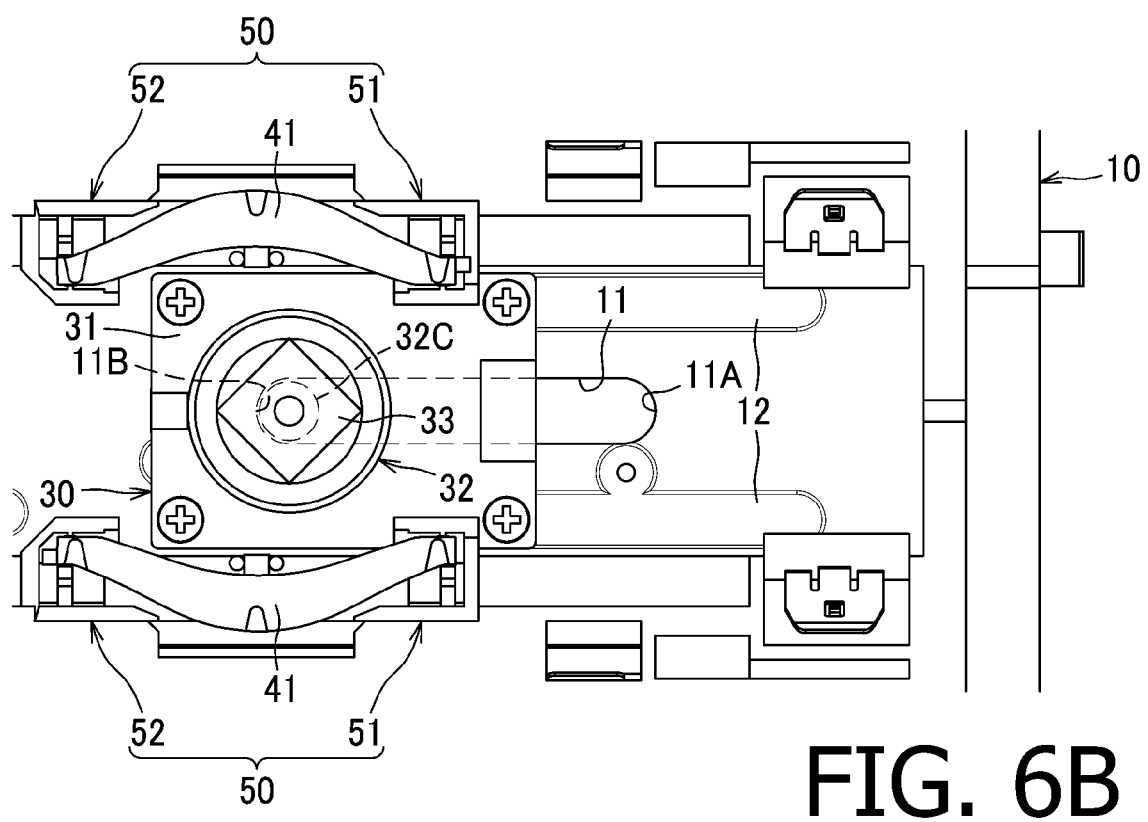
Figure 7:
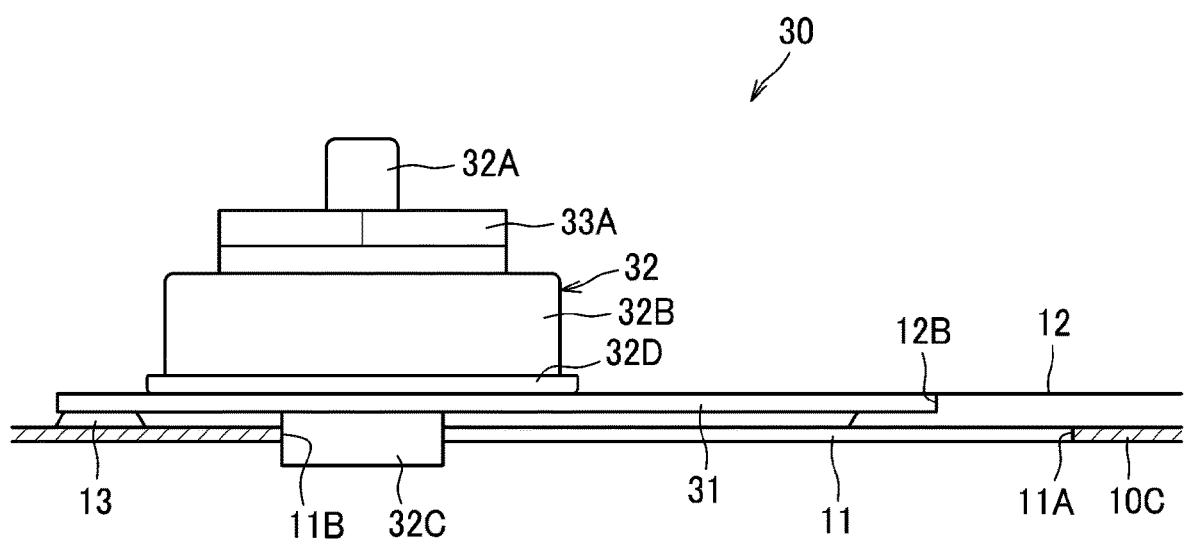

FIG. 1 is a perspective view of a scanning optical device according to an embodiment of the present disclosure.
FIG. 2A is a plan view of a deflector.
FIG. 2B is a side view of the deflector.
FIG. 3 is a sectional view of the scanning optical device.
FIG. 4 is an enlarged perspective view around a deflector attachment part and supporting parts of a frame.
FIG. 5 is a sectional view around the supporting part in a state where a scanning lens is assembled to the supporting part.
FIG. 6A is a plan view around the deflector attachment part and the supporting parts when a substrate is at a first position.
FIG. 6B is a plan view around the deflector attachment part and the supporting parts when the substrate is at a second position.
FIG. 7 is a sectional view illustrating a variation of a positioning part.

DETAILED DESCRIPTION

As shown in FIG. 1, a scanning optical device 1 according to the present embodiment includes a frame 10, an incident optical system 20, a deflector 30 and scanning optical systems 40. The scanning optical device 1 is typically applied to an electrophotographic image forming apparatus.

The frame 10 supports the incident optical system 20, the deflector 30 and the scanning optical systems 40. The frame 10 is formed of resin by injection molding.

The incident optical system 20 includes conventionally known components such as one or more laser diodes, one or more coupling lenses and one or more diaphragms, and is configured to make light incident on a polygonal mirror 33 of the deflector 30. According to the present embodiment, since the scanning optical device 1 is applied to a color image forming apparatus, the incident optical system 20 is provided with four laser diodes respectively emitting four light beams which are incident on the deflector 30.

The deflector 30 is a device that is configured to deflect the light beams incident from the incident optical system 20 in a main scanning direction shown in FIG. 1.

As shown in FIGS. 2A and 2B, the deflector 30 includes a substrate 31, a motor 32 and a polygonal mirror 33.

The substrate 31 is electrically connected to the motor 32 and thus supports the motor 32 and outputs signals for rotary driving the motor 32 to the motor 32. The substrate 31 has a rectangular outer shape. The substrate 31 has a hole through which a bearing 32C of the motor 32 passes and four holes 31A through which respective screws 39 for fixing the substrate 31 to the frame 10 pass. The four holes 31A are arranged near four corners of the substrate 31, respectively.

The motor 32 is fixed to the substrate 31. The motor 32 includes a rotation shaft 32A, a rotor 32B, a bearing 32C and a stator 32D. The stator 32D is fixed to the substrate 31. The bearing 32C is fixed to the stator 32D and supports the rotation shaft 32A rotatably about a rotation axis 32X. The rotor 32B rotates with respect to the stator 32D due to interaction with the stator 32D and rotates integrally with the rotation shaft 32A.

The bearing 32C has a cylindrical outer shape with an axis thereof extending along the rotation axis 32X of the motor 32. The bearing 32C passes through the hole of the substrate 31 and protrudes from the other side of the substrate 31. Therefore, the rotor 32B is arranged on one side of the substrate 31 and a distal end of the bearing 32C is arranged on the other side of the substrate 31.

The polygonal mirror 33 is rotary driven by the motor 32. The polygonal mirror 33 is fixed to the rotor 32B and rotates integrally with the rotation shaft 32A and the rotor 32B. The polygonal mirror 33 has a plurality of reflecting surfaces 33A on its outer circumference. As an example, in the present embodiment, the polygonal mirror 33 has four reflecting surfaces 33A. The light beams that are emitted by the incident optical system 20 and incident on the reflective surfaces 33A are deflected in the main scanning direction and are scanned in a constant angular velocity in accordance with the rotation of the polygonal mirror 3 rotating in a constant velocity. The light beams that are deflected in the main scanning direction by the deflector 30 are incident on the scanning optical systems 40.

As shown in FIG. 3, the scanning optical system 40 includes a first scanning lens 41, a second canning lens 42 and a plurality of mirrors 45. The first scanning lens 41 is a lens configured to refract a light beam that is deflected by the deflector 30 in the main scanning direction to focus the light beam on an image surface. The first scanning lens 41 is an tθ-lens which causes a light beam that is scanned at a constant angular velocity by the deflector 30 to move on the image surface at constant velocity. Within the scanning optical system 40, the first scanning lens 41 is arranged closer to the deflector 30 than the second scanning lens 42. The first scanning lens 41 is long in the main scanning direction. In the present embodiment, two scanning optical systems 40 are provided and the polygonal mirror 33 is arranged between the two first scanning lenses 41 of the two scanning optical systems 40. In other words, one of the two first scanning lenses 41 is arranged on one side with respect to the polygonal mirror 33, and the other of the two first scanning lenses 41 is arranged on the other side with respect to the polygonal mirror 33. A direction in which the polygonal mirror 33 is sandwiched by the two first scanning lenses 41 is the same as a direction of an optical axis 41X passing through a scanning center of the first scanning lenses 41 which will hereinafter be referred to as an "optical axis direction". The optical axis direction is orthogonal to the main scanning direction and a direction in which the rotation axis 32X extends (hereinafter referred to as a "rotation axis direction").

The second scanning lens 42 is a lens configured to refract a light beam that has passed through the first scanning lens 41 in a sub scanning direction orthogonal to the main scanning direction to focus the light beam on the image surface. In the scanning optical system 40, the second scanning lens 42 is arranged farther from the deflector 30 than the first scanning lens 41. The sub scanning direction is a direction parallel to the rotation axis direction.

The mirror 45 has a reflecting surface configured to reflect a light beam that has passed through the second scanning lens 42 toward the image surface. One or two mirrors 45 are provided for each of a plurality of the light beams.

The frame 10 includes a first accommodating part 10A that is open on one side in the rotation axis direction and second accommodating parts 10B that are open on the other side in the rotation axis direction. The second accommodating parts 10B are arranged on both sides of the first accommodating part 10A in the optical axis direction. In other words, two second accommodating parts 10B are arranged to be away from each other in the optical axis direction, and the first accommodating part 10A is arranged between the two second accommodating parts 10B.

In the first accommodating part 10A, the deflector 30 and the two first scanning lenses 41 are accommodated. In each of the second accommodating parts 10B, the second scanning lens 42 and a plurality of the mirrors 45 are accommodated.

The frame 10 includes a first bottom plate 10C that forms a bottom part of the first accommodating part 10A, two second bottom plates 10D that respectively form bottom parts of the two second accommodating parts 10B, and two separating walls 10E that connect the first bottom plate 10C and the second bottom plates 10D in the rotation axis direction and separating the first accommodating part 10A from the second accommodating parts 10B. The first bottom plate 10C has openings 10H that overlap with respective supporting parts 50, which will be described later, when viewed in the rotation axis direction. The openings 10H are for forming, by injection molding, spaces for placing the substrate 31 to overlap with the supporting parts 50 when viewed in the rotation axis direction, that is, for removing portions of a die for forming undercuts of supporting plates 53, which will be described later, in the rotation axis direction. To each separating wall 10E, an opening 10F is formed. Adjacent to each opening 10F, the first scanning lens 41 is arranged such that the light beams passing through the first scanning lens 41 can travel from the first accommodating part 10A to the second accommodating part 10B.

Referring back to FIG. 2, the substrate 31 has an outer shape that is longer in the main scanning direction than in the optical axis direction. Furthermore, a dimension of the substrate 31 in the optical axis direction is greater than a diameter of a circumcircle D1 of the polygonal mirror 33.

As shown in FIG. 4, the frame 10 includes, at a central part thereof, a deflector attachment part 10G to which the deflector 30 is attached and supporting parts 50 configured to support the first scanning lenses 41. The supporting parts 50 are portions that support end portions of the first scanning lenses 41 being scanning lenses that are closest to the deflector 30.

The deflector attachment part 10G is formed on the first bottom plate 10C and includes a groove 11 being an example of a guide, first substrate supporting parts 12 and second substrate supporting parts 13.

The groove 11 is formed in the form of an elongated hole penetrating through the first bottom plate 10C of the frame 10. The groove 11 is long in the main scanning direction which is orthogonal to the optical axis direction and includes a first end 11A that is farther from the incident optical system 20 and a second end 11B that is closer to the incident optical system 20. The groove 11 has a width corresponding to a diameter of the bearing 32C, and the first end 11A and the second end 11B respectively have semicircular shapes corresponding to an outer shape of the bearing 32C. When assembling the substrate 31 to the frame 10, the groove 11 guides the substrate 31, and thus the deflector 30, to be movable between a first position shown in FIG. 6A and a second position shown in FIG. 6B by guiding the bearing 32C fixed to the substrate 31. As can be seen from the drawings (e.g., FIGS. 1, 6A and 6B), the deflector 30 is farther from the incident optical system 20 when at the first position than when at the second position.

The first substrate supporting parts 12 are trapezoidal portions protruding from the first bottom plate 10C and configured to support the substrate 31. In the present embodiment, two first substrate supporting parts 12 are provided separately from each other in the optical axis direction. The first substrate supporting parts 12 are arranged farther from the incident optical system 20 than the second end 11B of the groove 11. The first substrate supporting parts 12 are long in the main scanning direction and respectively have smooth surfaces over which the substrate 31 can slide when assembling the substrate 31 to the frame 10. At an end portion of each first substrate supporting part 12 closer to the incident optical system 20, an attachment hole 12A with which the screw 39 can engage is formed.

The second substrate supporting parts 13 are trapezoidal portions protruding from the first bottom plate 10C and configured to support the substrate 31. In the present embodiment, two second substrate supporting parts 13 are provided separately from each other in the optical axis direction. The second substrate supporting parts 13 are arranged closer to the incident optical system 20 than the groove 11. The second substrate supporting parts 13 respectively have circular shapes when viewed in the rotation axis direction. At the center of each second substrate supporting part 13, an attachment hole 13A with which the screw 39 can engage is formed.

As shown in FIG. 6A, the attachment holes 12A and 13A do not overlap with the supporting parts 50 when viewed in the rotation axis direction. Therefore, it is easy to make the screws 39 engage with the attachment holes 12A and 13A.

As shown in FIG. 4, each supporting part 50 includes a first supporting part 51 configured to support one end of the first scanning lens 41 in the longitudinal direction and a second supporting part 51 configured to support the other end of the first scanning lens 41 in the longitudinal direction. The first supporting part 51 supports an end portion of the first scanning lens 41 in the longitudinal direction that is farther from the incident optical system 20, and the second supporting part 52 supports an end portion of the first scanning lens 41 in the longitudinal direction that is closer to the incident optical system 20. Each supporting part 50 also includes a supporting plate 53. As shown in FIG. 5, the supporting plates 53 of the supporting part 50 face a surface 31F of the substrate 31 on the polygonal mirror 33 side. Furthermore, at least a portion of each supporting part 50 is arranged between the substrate 31 and the optical axis line 41X of the first scanning lens 41 in the rotation axis direction.

Each supporting plate 53 extends from each separating wall 10E in the optical axis direction along the first bottom plate 10C. Each supporting plate 53 is away from the first bottom plate 10C in the rotation axis direction to an extent enough to receive the substrate 31 between the supporting plate 53 and the first bottom plate 10C. Each supporting plate 53 includes supporting surfaces 53A respectively arranged at both end portions in the main scanning direction. Each supporting surface 53A is provided at a top surface of a portion protruding from the supporting plate 53. The supporting surfaces 53A configure portions of the first supporting part 51 and the second supporting part 52 and support a surface 41A of the first scanning lens 41 on a side closer to the substrate 31 in the sub scanning direction. The supporting surfaces 53A are positioning surfaces for the first scanning lens 41 in the sub scanning direction (i.e., the rotation axis direction).

Each first supporting part 51 includes the aforementioned supporting surface 53A, a supporting wall 51A extending from the supporting plate 53 in the rotation axis direction away from the first bottom plate 10C, and a spring 55 configured such that the first scanning lens 41 is held between the spring 55 and the supporting wall 51A (also see FIG. 4).

The supporting wall 51A has a rib 51B that protrudes toward the spring 55 and extends in the rotation axis direction. A distal surface of the rib 51B is a positioning surface that contacts with a surface 41B of the first scanning lens 41 in the optical axis direction.

The spring 55 is formed of resin integrally with the separating wall 10E and extends from the separating wall 10E. Specifically, the spring 55 includes a first extended part 55A that extends from the separating wall 10E in the optical axis direction, a second extended part 55B that extends from an end of the first extended part 55A in the rotation axis direction, and a protruded part 55C that protrudes from an end of the second extended part 55B toward the supporting wall 51A. A distal surface of the protruded part 55C contacts with a surface 41C of the first scanning lens 41 facing the optical axis direction.

As shown in FIG. 4, each second supporting part 52 has similar configuration as the first supporting part and thus includes the aforementioned supporting surface 53A, a supporting wall 52A that extends from the supporting plate 53 in the rotation axis direction away from the first bottom plate 10C, and a spring 55 configured such that the first scanning lens 41 is held between the spring 55 and the supporting wall 52A.

The supporting wall 52A has a rib 52B that protrudes toward the spring 55 and extends in the rotation axis direction and a distal surface of the rib 52B forms a positioning surface that contacts with the surface 41B (see FIG. 5) of the first scanning lens 41 facing the optical axis direction. Since the spring 55 has similar configuration as the spring 55 facing the supporting wall 51A, the description of the spring 55 is herein omitted.

All the parts of the frame 10 described above are integrally formed with resin. That is, the supporting parts 50 that support the first scanning lenses 41 and the deflector attachment part 10G that supports the deflector 30 are integrally formed.

In order to assemble the deflector 30 to the frame 10, as shown in FIG. 6A, the bearing 32C of the motor 32 is made to fit to the first end 11A of the groove 11 and the substrate 31 is placed on the first substrate supporting parts 12, thereby positioning the substrate 31 at the first position. At this stage, the substrate 31 does not overlap with the supporting parts 50 when viewed in the rotation axis direction.

Then, the substrate 31 is made to slide over the first substrate supporting parts 12 in the main scanning direction to bring closer to the incident optical system 20. At this stage, the groove 11 guides the sliding movement of the substrate 31. Then, as shown in FIG. 6B, as the bearing 32C of the motor 32 abuts the second end 11B of the groove 11, the substrate 31 is positioned in the main scanning direction (i.e., in the direction in which the groove 11 extends) and is thereby positioned at the second position. That is, in the present embodiment, the second end 11B of the groove 11 serves as a positioning part. In this state, when viewed in the rotation axis direction, the substrate 31 overlaps with portions of the supporting parts 50 that support the first scanning lenses 41 which are scanning lenses that are closest to the deflector 30. More specifically, when viewed in the rotation axis direction, the substrate 31 overlaps with the first supporting parts 51 but does not overlap with the second supporting parts 52. In a state where the substrate 31 is at the second position, the groove 11 extends from the bearing 32C in a direction away from the incident optical system 20.

Upon the substrate 31 is positioned at the second position, the screws 39 are inserted in respective holes 31A of the substrate 31 and are made to engage with respective attachment holes 12A and 13A to fix the substrate 31 to the frame 10. The deflector 30 is thereby assembled to the frame 10.

In order to attach the first scanning lens 41 to the supporting part, one end of the first scanning lens 41 in the longitudinal direction is nipped between the supporting wall 51A and the spring 55, and the other end of the first scanning lens 41 in the longitudinal direction is nipped between the supporting wall 52A and the spring 55. Then, the first scanning lens 41 is positioned in the sub scanning direction by making the surface 41A of the first scanning lens 41, facing the sub scanning direction and closer to the substrate 31, contact the supporting surfaces 53A.

According to the scanning optical device 1 that has the configuration described above, the following effects can be obtained. In the scanning optical device 1, since the frame 10 which supports the deflector 30 has the supporting parts 50 that support the first scanning lenses 41, an accuracy of positions of the first scanning lenses 41 with respect to the polygonal mirror 33 of the deflector 30 can be secured. Furthermore, since the substrate 31 and portions of the supporting parts 50 overlap when viewed in the rotation axis direction of the motor 32, the supporting parts 50 can be arranged closer to the rotation axis 32X of the motor 32 (i.e., a rotation axis of the polygonal mirror 33) and thus the first scanning lenses 41 can be arranged closer to the polygonal mirror 33.

Since the substrate 31 is guided by the groove 11 to be movable from the first position to the second position, even if the substrate 31 and portions of the supporting parts 50 overlap when viewed in the rotation axis direction of the motor 32 as in the present embodiment, the substrate 31 can be assembled to the frame 10 without causing the substrate 31 to interfere with the supporting parts 50 by placing the substrate 31 at the first position and then making the substrate 31 to move to the second position. Even with a configuration in which the polygonal mirror 33 is arranged between two first scanning lenses 41 as in the present embodiment, that is, a configuration in which the substrate 31 overlaps with lots of portions of the supporting parts 50 when viewed in the rotation axis direction of the motor 32, it is possible to assemble the substrate 31 to the frame 10.

Since the groove 11 extends in the main scanning direction, the substrate 31 is less likely to interfere with the first scanning lenses 41 and the supporting parts 50 when assembling the substrate 31 to the frame 10. Furthermore, since the groove 11 extends from the bearing 32C in the direction away from the incident optical system 20 in the state where the substrate 31 is at the second position, the substrate 31 is less likely to interfere with the incident optical system 20 when assembling the substrate 31 to the frame 10.

Since the substrate 31 is positioned in a direction in which the groove 11 extend by making the bearing 32C contact with the second end 11B of the groove 11, the position of the substrate with respect to the frame 10 can be made accurate.

Since the dimension of the substrate 31 in the optical axis direction of the first scanning lens 41 is greater than the diameter of the circumcircle D1 of the polygonal mirror 33, it is possible to firmly fix the motor 32 to the frame 10 and stabilize the rotation of the polygonal mirror 33.

Since the substrate 31 does not overlap with the second supporting parts 52 when viewed in the rotation axis direction of the motor 32, it is possible to make assembly of the substrate 31 easier.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

In the above-described embodiment, the groove 11 serves as the guide for guiding the movement of the substrate 31. However, the guide may be one or more protrusions or ribs. Furthermore, the groove 11 needs not be a through hole penetrating through the first bottom plate 10C but may be a groove having a bottom portion.

In the above-described embodiment, the second end 11B of the groove 11 positions the substrate 31 in the direction the groove 11 extends. However, the frame 10 may include a positioning part separately from the second end 11B. For example, as shown in FIG. 7, a positioning part 12B that is stepped such that a portion of the first substrate supporting part 12 farther from the incident optical system 20 becomes higher may be provided to the first substrate supporting part 12 so that, when the substrate 31 is at the second position, it becomes harder for the substrate 31 to move away from the incident optical system 20. In this case, only the stepped positioning part 12B may serve to position the substrate 31 in the moving direction of the substrate 31, or both the stepped positioning part 12B and the second end 11B may serve to position the substrate 31 at the second position. In case both the stepped positioning part 12B and the second end 11B serve to position the substrate 31 at the second position, the positioning part 12B restricts movement of the substrate 31 positioned at the second position toward one side in the main scanning direction (i.e., the moving direction of the substrate 31), and the second end 11B restricts movement of the substrate 31 positioned at the second position toward the other side in the main scanning direction.

By forming the positioning part 12B in the stepped shape as described above, since the substrate 31 falls down when the substrate 31 is moved along the groove 11 to the second position, it becomes easier to know, by feeling, that the substrate 31 is positioned at the second position. Furthermore, it becomes less likely that the substrate 31 unexpectedly moves off the frame 10 before the substrate 31 is screwed to the frame 10.

In the above-described embodiment, the substrate 31 overlaps with the first supporting parts 51 being portions of the supporting parts 50 but does not overlap with the second supporting parts 52 when viewed in the rotation axis direction of the motor 32. However, the substrate 31 may overlap with the second supporting parts 52 as well.

In the above-described embodiment, the scanning optical device applied to a color image forming apparatus has been illustrated. However, the scanning optical device may be the one to be applied to a monochrome image forming apparatus in which only one light beam is scanned.

The components included the above-described embodiment and variations can further be practiced while appropriately combining them.

What is claimed is:
1. A scanning optical device comprising:
a deflector including a substrate, a motor fixed to the substrate, and a polygonal mirror rotary driven by the motor;

a scanning lens arranged such that a longitudinal direction thereof is oriented in a main scanning direction of the deflector; and a frame configured to support the scanning lens and the deflector, the frame including a supporting part configured to support the scanning lens, the supporting part being located such that the substrate and at least a portion of the supporting part overlap when viewed in a rotation axis direction of the motor, wherein the frame includes a guide configured to guide the deflector to move between a first position, where the substrate does not overlap with the supporting part when viewed in the rotation axis direction, and a second position, where the substrate overlaps with the supporting part when viewed in the rotation axis direction.

2. The scanning optical device of claim 1, wherein the motor includes a bearing which is arranged on an opposite side of the substrate with respect to the polygonal mirror, and wherein the guide has a groove formed on the frame and configured to guide the bearing.

3. The scanning optical device of claim 1, wherein the guide extends in a direction parallel to the main scanning direction.

4. The scanning optical device of claim 1, further comprising an incident optical system configured to make light incident on the polygonal mirror, wherein the deflector is farther from the incident optical system when at the first position than when at the second position.

5. The scanning optical device of claim 1, wherein the frame includes a positioning part configured to position the substrate at the second position in a direction in which the guide extends.

6. The scanning optical device of claim 5, wherein the positioning part restricts movement of the substrate toward one side in a moving direction of the substrate and toward the other side in the moving direction of the substrate.

7. The scanning optical device of claim 1 comprising two scanning lenses, wherein one of the two scanning lenses is arranged on one side with respect to the polygonal mirror in a direction orthogonal to the main scanning direction and the rotation axis direction, and the other of the two scanning lenses is arranged on the other side with respect to the polygonal mirror in the direction orthogonal to the main scanning direction and the rotation axis direction.

8. The scanning optical device of claim 1, wherein a dimension of the substrate in a direction of an optical axis which passes through a scanning center of the scanning lens is greater than a diameter of a circumcircle of the polygonal mirror.

9. The scanning optical device of claim 1, wherein the supporting part supports a surface of the scanning lens closer to the substrate in the rotation axis direction.

10. The scanning optical device of claim 1, wherein the supporting part includes a first supporting part configured to support one end of the scanning lens in the main scanning direction and a second supporting part configured to support the other end of the scanning lens in the main scanning direction, and wherein the substrate overlaps with the first supporting part but does not overlap with the second supporting part when viewed in the rotation axis direction of the motor.

11. The scanning optical device of claim 1, wherein the frame is integrally formed with resin.

12. The scanning optical device of claim 1, wherein the frame includes a bottom plate facing an opposite side of the substrate with respect to the polygonal mirror, and wherein the bottom plate has an opening which overlaps with the supporting part when viewed in the rotation axis direction.

13. A scanning optical device comprising:

a deflector including a substrate, a motor fixed to the substrate, and a polygonal mirror rotary driven by the motor;

a scanning lens arranged such that a longitudinal direction thereof is oriented in a main scanning direction of the deflector; and a frame configured to support the scanning lens and the deflector, the frame including a supporting part configured to support the scanning lens, the supporting part being located such that the substrate and at least a portion of the supporting part overlap when viewed in a rotation axis direction of the motor, wherein the supporting part includes a first supporting part configured to support one end of the scanning lens in the main scanning direction, and a second supporting part configured to support the other end of the scanning lens in the main scanning direction, and wherein the substrate overlaps with the first supporting part but does not overlap with the second supporting part when viewed in the rotation axis direction of the motor.

14. The scanning optical device of claim 13 comprising two scanning lenses, wherein one of the two scanning lenses is arranged on one side with respect to the polygonal mirror in a direction orthogonal to the main scanning direction and the rotation axis direction, and the other of the two scanning lenses is arranged on the other side with respect to the polygonal mirror in the direction orthogonal to the main scanning direction and the rotation axis direction.

15. The scanning optical device of claim 13, wherein a dimension of the substrate in a direction of an optical axis which passes through a scanning center of the scanning lens is greater than a diameter of a circumcircle of the polygonal mirror.

16. The scanning optical device of claim 13, wherein the supporting part supports a surface of the scanning lens closer to the substrate in the rotation axis direction.

17. The scanning optical device of claim 13, wherein the frame is integrally formed with resin.

18. The scanning optical device of claim 13, wherein the frame includes a bottom plate facing an opposite side of the substrate with respect to the polygonal mirror, and wherein the bottom plate has an opening which overlaps with the supporting part when viewed in the rotation axis direction.

* * * * *